United States Patent Office 3,516,507
Patented June 23, 1970

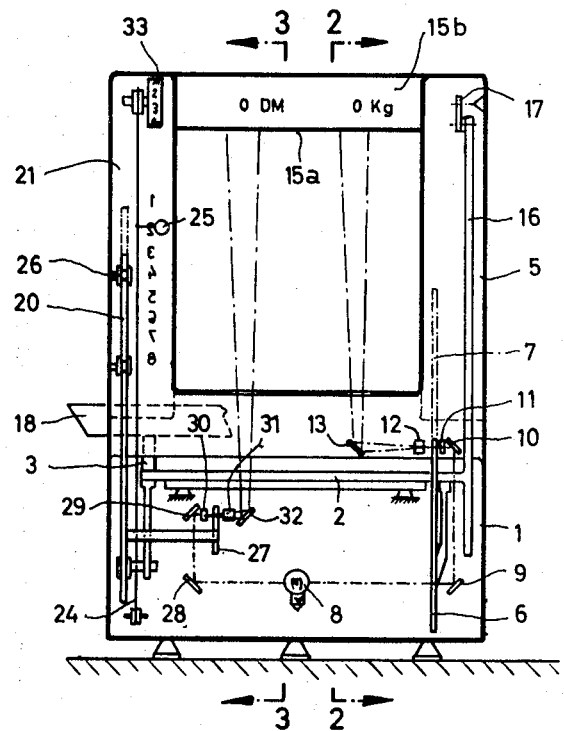
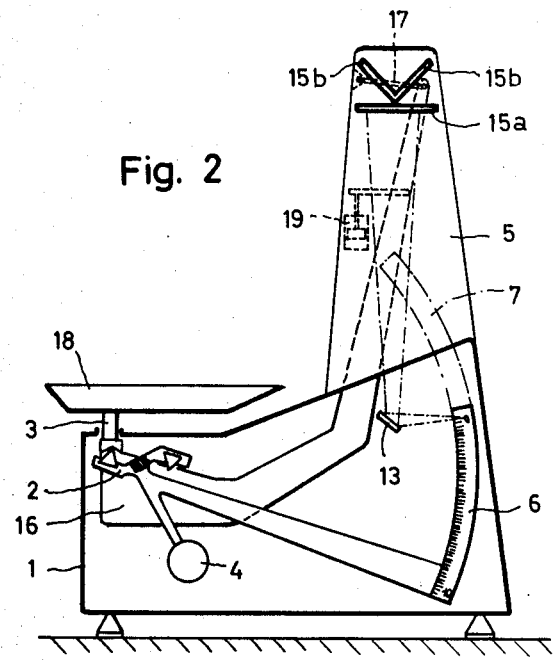

---

3,516,507
WEIGHING SCALES
Ernst Kuhnle and Josef Schwarz, Balingen, Germany, assignors to Bizerba-Werke Wilhelm Kraut KG., Balingen, Germany, a firm
Filed Dec. 7, 1967, Ser. No. 688,935
Claims priority, application Germany, Dec. 7, 1966, B 90,185
Int. Cl. G01g 1/02
U.S. Cl. 177—216                                      6 Claims

ABSTRACT OF THE DISCLOSURE

A weighing scale for weighing and also, if desired, indicating the price of a load which is carried by a load carrier of the scale. The scale has a hollow housing which houses a weighing means for weighing a load carried by the load carrier, and this housing has a lower hollow portion and a pair of upstanding hollow columns extending upwardly from the lower housing portion and spaced from each other so that the load carrier is visible from all sides of the columns as well as through the space therebetween. An indicating means is carried by the columns at an elevation spaced above the lower housing portion for indicating information such as the weight and price of a load carried by the load carrier.

---

BACKGROUND OF THE INVENTION

The invention relates to weighing scales.

In particular, the present invention relates to weighing scales having a housing which houses the weighing mechanism and over which is situated a load-carrying pan or the like on which the load which is to be weighed is supported. This scale also has an indicating means for indicating the weight and also the price of a load carried by the load-carrying means.

There are known weighing scales of this general type which, however, have the disadvantage of requiring an undesirably large amount of space. The housing for the weighing scale is so great and bulky that the load-carrying pan or the like is situated at an undesirably high elevation rendering manipulations in connection with the scale inconvenient to carry out and also making control of the scale by customers difficult.

SUMMARY OF THE INVENTION

It is accordingly a primary object of the present invention to provide a weighing scale of the above general type which will avoid the above drawbacks.

In particular, it is an object of the invention to provide a weighing scale having a weighing mechanism capable of carrying out all of the required operations while at the same time coacting with a load-carrying pan or the like which is situated at an elevation which is low enough to provide for exceedingly convenient manipulations.

The invention provides a weighing scale of this general type which has a low housing portion provided with upstanding columns which carry above the housing portion an indicating means for indicating information such as the weight and cost of a load on the load-carrying means.

In particular, it is an object of the invention to provide a structure of this type which will render the load-carrying pan or the like visible from all sides of the weighing scale, including the space between the upstanding columns thereof.

Furthermore, it is an object of the present invention to provide a construction which will enable the housing of the scale to be of a reduced size as compared to conventional scale housings.

The above objects of our invention are achieved in part by providing columns of the above type which are hollow and which accommodate components, preferably elongated components of the weighing means which are situated within the housing of the weighing scale. Thus, in accordance with the invention, an elongated guide rod of a follower device, which follows and scans the position of a weighing member, extends along the interior of a hollow housing column in a direction substantially parallel thereto. Also, the weighing means includes a lever arm which has an elongated portion extending along the hollow interior of one of the columns in a direction substantially parallel thereto. In this way, by utilizing the hollow interiors of the columns themselves to accommodate structure within the housing, the portion of the housing which carries the columns can be made lower than would otherwise be possible, thus enabling the entire housing side to be reduced and enabling the load-carrying pan itself to be situated at a lower elevation than would otherwise be possible.

BRIEF DESCRIPTION OF DRAWING

The invention is illustrated by way of example in the accompanying drawings which form part of this application and in which:

FIG. 1 is a schematic elevation of a weighing scale of our invention as it appears when a customer looks toward the rear thereof;

FIG. 2 is a schematic partly sectional side elevation taken along line 2—2 of FIG. 1 in the direction of the arrows;

DESCRIPTION OF A PREFERRED EMBODIMENT

Figure 3:
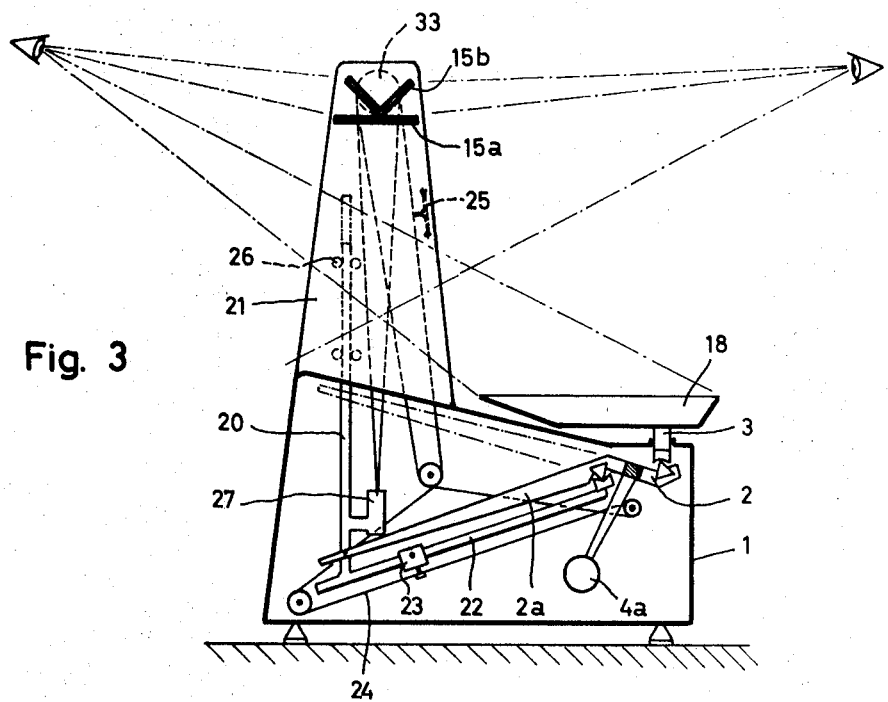
FIG. 3 is a schematic sectional side elevation taken along line 3—3 of FIG. 1 in the direction of the arrows.

Referring now to the drawings, the weighing scale illustrated therein includes a hollow housing 1 of substantially block-shaped configuration which has a hollow lower portion housing a weighing means which includes a transversely extending beam 2 which supports the load-carrying means 3 provided in the illustrated example with an outer pan 18 for receiving the load which is to be weighed. This load-carrying means 3 is movable in a known way through openings in a forward top wall portion of the lower part of the housing 1.

The weighing lever or beam 2 of the weighing means is situated within the lower portion of the housing 1 and carries on a first extension a counterweight 4 as well as on a second beam extension weight indicator 6 in the form of a transparent member having weight graduations thereon and carried by a rear portion of the beam 2 which is situated beneath a hollow column 5 of the housing 1, this hollow column 5 extending upwardly from and communicating with the interior of the lower hollow portion of the housing 1. When a load is placed in the pan 18 it is possible for the weighing lever 2 to swing in a counter-clockwise direction, as viewed in FIG. 2, so as to displace the indicator 6 up to the position 7 where it extends into the hollow interior of the column 5.

An image of part of the indicator 6 is transmitted by an optical means to an indicating means 15 which includes a matted or frosted glass plate 15a onto which an image of part of the indicator 6 is projected. This optical means includes a lamp 8 which is situated within the housing 1 (FIG. 1) and which directs light to the reflectors 9 and 10 and then through a condenser 11 and objective 12 to an additional reflector 13 which directs the image upwardly through a transparent portion of the top wall of the lower housing part up to the right portion of the indicating means 15, as viewed in FIG. 1.

The weighing lever 2 is in addition fixed with a lever arm 16 of the weighing means, this lever arm 16 serving to guide the load-carrying means 3, 18 for movement, and at its top end the lever arm 16 is pivotally connected with a link 17 whose end distant from the arm 16 is pivoted to a stationary bracket, as is apparent from the upper right portion of FIG. 1 and the upper portion of FIG. 2. It will be noted that this arm 16 extends upwardly along the hollow interior of the column 5 substantially parallel to the axis of the latter. The link 17 is situated within the hollow interior of the column 5 at the upper end thereof. Also, there is situated within the hollow column 5 a damping means 19 such as an oil type of shock absorber which reduces the vibrations of the pan 18.

At the left part of the housing 1, as viewed in FIG. 1, the weighing lever 2 includes an extension 2a (FIG. 3) and a tilting counterweight 4a. A guide rod 20 extends along the hollow interior of the other column 21 of the housing in a direction substantially parallel thereto, and this guide rod 20 forms part of a follower mechanism for following and thus scanning the position of the weighing means, and more particularly the position of the extension 2a of the beam 2. Thus, in a known way, the guide rod 20 carries an arm 22 on which is situated an adjustable scanning pin 23 which, by a cable 24 which is guided around suitable pulleys, is connected with a unit price adjusting mechanism 25 which sets the device to provide the price for the weight of the load according to a give price per unit of weight. Thus, the unit price which is adjusted in a known way and which may indicate the cost per kilogram, for example, can be read at the unit price indicator wheel 33 which has a pair of opposed portions visible at the front and rear of the column 21 so as to indicate both to the operator and to the customer the price per unit of weight for which the device 25 has been initially set. The guide rod 20, which is fixed to a transparent price indicator 27, whose image can be projected onto the matted glass plate 15a, is guided by guide rollers 26 which are situated within the hollow column 21. Thus, it will be noted that this hollow column 21 guides not only the rod 20 and the guiding structure therefor, but also structures such as the unit price indicating scale 33, the unit price setting structure 25, and also part of the cable and pulley assembly 24.

The indicating means 15 which is formed in part by the matted glass plate 15a also includes reflectors 15b for providing forwardly and rearwardly directed images of the weight and cost of the load carried by the load-carrying means 3, 18. This indicating means 15 is carried by the hollow columns 5 and 21 of the housing at an elevation spaced above the lower portion of the housing, and it will be noted that the hollow columns 5 and 21 extend upwardly from opposed sides of the lower portion of the housing at the rear of the lower portion of the housing 1, this housing 1 having at its top wall a forward portion situated beneath the pan 18 and a rear portion extending upwardly and rearwardly from the forward portion of the top wall into the space between the columns 5 and 21. As a result of this arrangement it is possible for a customer to view the pan 18 from all sides of the columns 5 and 21 as well as through the space therebetween, as is indicated by the dot-dash lines in FIGS. 3 and 4.

During operation of the scale of the invention the extension 2a of the beam 2 will assume a predetermined angular position, in accordance with the weight of the load carried by the pan 18, and is then clamped in this position by an unillustrated known mechanism which is not further described. The guide rod 20 of the follower mechanism is driven in a known way to follow the position of the extension 2a and displaces the arm 22 until the scanning pin 23 engages and is stopped by the extension 2a, so that in this way the follower means will assume a position determined by the position of the extension 2a.

In this way the price indicator 27 is brought into a position for properly indicating the cost of the load carried by the pan 18. The lamp 8 directs light also to a pair of reflectors 28 and 29 which direct the light through a condenser 30 and an objective 31 where it is received by the reflector 32 which directs the image of the pirce upwardly through a second transparent part of the top wall of the lower portion of the housing to the indicating means 15. The price indicator 27 which is transparent is situated between the condenser 30 and the objective 31, as indicated schematically in FIG. 1, and of course the indicator 6 shown in FIG. 2 is situated between the condenser 11 and objective 12 of the other optical system, as is also indicated schematically in FIG. 1.

Figure 4:
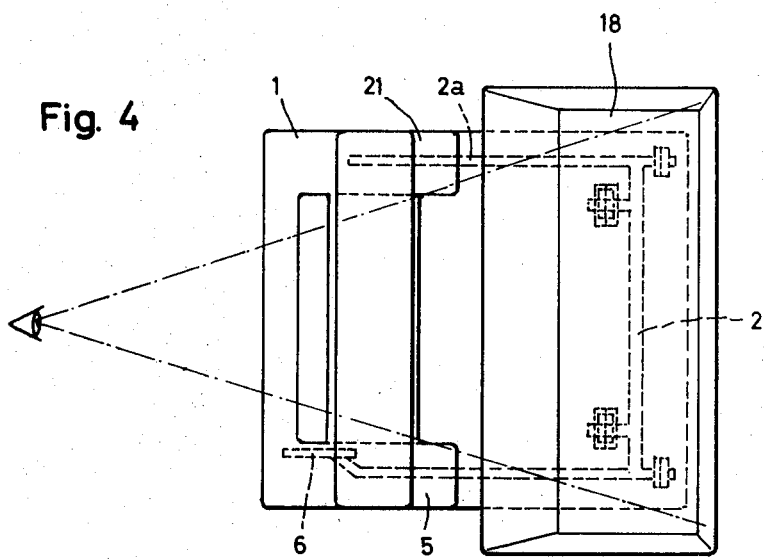
FIG. 4 is a schematic top plan view of the scale of FIGS. 1–3.

Thus, while the space between the columns 5 and 21 is available for full viewing of the pan 18 from all sides, this space is also used for the projecting of the images of the weight and price upwardly from the transparent portions of the top wall of the lower housing part to the indicating means 15. The images on the frosted glass plate 15a are reflected forwardly and rearwardly by the inclined reflectors 15b, as indicated in FIG. 3.

The primary advantage of the invention resides in the fact that essential components of the weighing means, such as the guide rod 20, the lever arm 16 and the indicator 6 are situated within or are movable into and out of the hollow columns 5 and 21. In this way the housing of the scale can be made correspondingly smaller and the pan 18 itself can be situated at a relatively low elevation, rendering the operations extremely convenient to carry out.

What is claimed is:

1. In a weighing scale, a housing having a hollow lower portion and a pair of spaced upstanding hollow columns extending upwardly from and communicating with the interior of said lower housing portion, load-carrying means situated over said lower portion of said housing for carrying a load which is to be weighed, weighing means mounted in said housing and operatively connected to said load-carrying means for weighing a load carried thereby, said weighing means including a follower mechanism for following the position of a weighing member of said weighing means, and said follower mechanism including an elongated guide rod extending along the interior of one of said columns in a direction substantially parallel thereto, and said weighing means further including an elongated guide rod of the follower mechanism extending along the interior of the other of said columns in a direction substantially parallel thereto, and indicating means carried by said columns at an elevation spaced above said lower portion of said housing for indicating information such as the weight and price of a load carried by said load-carrying means, whereby the load-carrying means is visible from all sides of said housing, from both sides of and through the space between said columns.

2. The combination of claim 1 and wherein said indicating means provides an optical image of information such as the weight and price of a load carried by said load carrying means, said housing having beneath said indicating means a transparent wall portion, and projecting means situated within said housing for projecting upwardly through said transparent wall portion to said indicating means an image to be received thereby.

3. The combination of claim 1 and wherein said weighing means includes a swingable beam carrying a counterweight and having a portion situated beneath one of said hollow columns, a transparent indicator carried by said portion of said beam and swingable into and out of said one column during swinging of said beam, and optical means coacting with said transparent indicator for optically transmitting an image of a portion thereof to said indicating means.

4. The combination of claim 1 and wherein said lower housing portion has a forward portion where said load-carrying means is located and a rear portion where said hollow columns are located.

5. The combination of claim 4 and wherein said lower housing portion has a pair of opposed sides from which said columns respectively extend.

6. The combination of claim 5 and wherein said lower portion of said housing has beneath said load-carrying means a forward top wall portion and beyond said load-carrying means a rearward top wall portion extending rearwardly from said load-carrying means between said columns and inclined upwardly from said forward top wall portion.

References Cited

UNITED STATES PATENTS 1,213,296    1/1917    Strubler _ _ _ _ _ _ _ _ _ _ _ _ 177—242

FOREIGN PATENTS 332,141    7/1930    Great Britain.
1,342,658    9/1963    France.

RICHARD B. WILKINSON, Primary Examiner

G. H. MILLER, Jr., Assistant Examiner

U.S. Cl. X.R.

177—178, 241